United States Patent
Sakai et al.

(10) Patent No.: US 7,912,243 B2
(45) Date of Patent: Mar. 22, 2011

(54) DECODING DEVICE, DECODING METHOD AND DECODING PROGRAM

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 945 days.

(21) Appl. No.: 11/785,563

(22) Filed: Apr. 18, 2007

(65) Prior Publication Data

US 2008/0031529 A1 Feb. 7, 2008

(30) Foreign Application Priority Data

Aug. 3, 2006 (JP) .................................. 2006-212119

(51) Int. Cl.
*G06K 9/00* (2006.01)
*G06K 15/00* (2006.01)
*H04N 1/40* (2006.01)
(52) U.S. Cl. ........................................ 382/100; 358/3.28
(58) Field of Classification Search .................. 382/100; 358/3.28
See application file for complete search history.

(56) References Cited

U.S. PATENT DOCUMENTS

| | | | |
|---|---|---|---|
| 6,522,766 B1* | 2/2003 | Ratnakar | 382/100 |
| 6,704,431 B1* | 3/2004 | Ogawa et al. | 382/100 |
| 6,766,056 B1* | 7/2004 | Huang et al. | 382/190 |
| 6,898,297 B2* | 5/2005 | Katsura et al. | 382/100 |
| 7,523,311 B1* | 4/2009 | Matsui | 713/176 |
| 2001/0010730 A1* | 8/2001 | Rhoads | 382/100 |
| 2002/0135810 A1* | 9/2002 | Ikenoue et al. | 358/3.28 |
| 2003/0021442 A1* | 1/2003 | Suzaki | 382/100 |
| 2003/0095683 A1* | 5/2003 | Najarian | 382/100 |
| 2004/0120546 A1* | 6/2004 | Yoshiura et al. | 382/100 |
| 2004/0234139 A1* | 11/2004 | Moroo et al. | 382/232 |
| 2005/0055554 A1 | 3/2005 | Sion et al. | 713/176 |
| 2005/0147296 A1* | 7/2005 | Hilton et al. | 382/170 |
| 2006/0239501 A1* | 10/2006 | Petrovic et al. | 382/100 |
| 2007/0067636 A1* | 3/2007 | Ogawa et al. | 713/176 |

FOREIGN PATENT DOCUMENTS

| | | |
|---|---|---|
| EP | 1480163 | 11/2004 |
| JP | 2004-349879 | 12/2004 |

OTHER PUBLICATIONS

Wang et al. "Combination of multiple classifiers for handwritten word recognition", Proceedings of the Eighth International Workshop on Frontiers in Handwriting Recognition (IWFHR'02). IWFHR 2002.*

Patra, J. et al., "Bi-Level Image Watermarking for Image Authentication Surviving JPEG Lossy Compression," IEEE 2004 International Conference on Image Processing, pp. 713-716.

Extended European Search Report dated Nov. 22, 2007 in corresponding European Patent Application No. 07107410.8 (9 pages).

* cited by examiner

*Primary Examiner* — Samir A Ahmed
*Assistant Examiner* — Li Liu
(74) *Attorney, Agent, or Firm* — Fujitsu Patent Center (57) ABSTRACT

A decoding device has data extracting units extracting data from an image, data occurrence frequency calculating units calculating an occurrence frequency of data on a digit-by-digit basis, weighting units setting a weight corresponding to the occurrence frequency for every reference code so that the data with a smaller occurrence frequency in the extracted data becomes a majority in a decision by a weighted majority, first decision-by-majority units deciding the detection result of the data on the basis of the decision by the weighted majority, and judging units judging whether the image is falsified or non-falsified in accordance with whether the detection code decided by the first decision-by-majority units, is correct or erroneous.

21 Claims, 9 Drawing Sheets

(EXPLANATONOTE)

PRIOR ART

DECODING DEVICE, DECODING METHOD AND DECODING PROGRAM

BACKGROUND OF THE INVENTION

The present invention relates to a decoding device, a decoding method and a decoding program for detecting falsification of an image.

A method of embedding a code into an image is exemplified by a method of segmenting the image on a block-by-block basis and embedding the code on the basis of a relationship between level magnitudes of pixel values of neighboring blocks. Further, a decoding method of extracting the code embedded into the image is exemplified by a method (as given in, e.g., Patent document 1) of previously embedding the same code so as to be repeated a plural number of times and deciding the code exhibiting a highest frequency in the plurality of codes extracted from the image on the basis of a decision by a majority. According to this method, even if a partial error exists in the extracted code, a correct code can be acquired. This is based on such an idea that if there are a large number of correct codes even when the extracted codes are partially erroneous, the correct code can be acquired based on the decision by the majority.

[Patent document 1] Japanese Patent Application Laid-Open Publication No. 2004-349879

SUMMARY OF THE INVENTION

Figure 9:
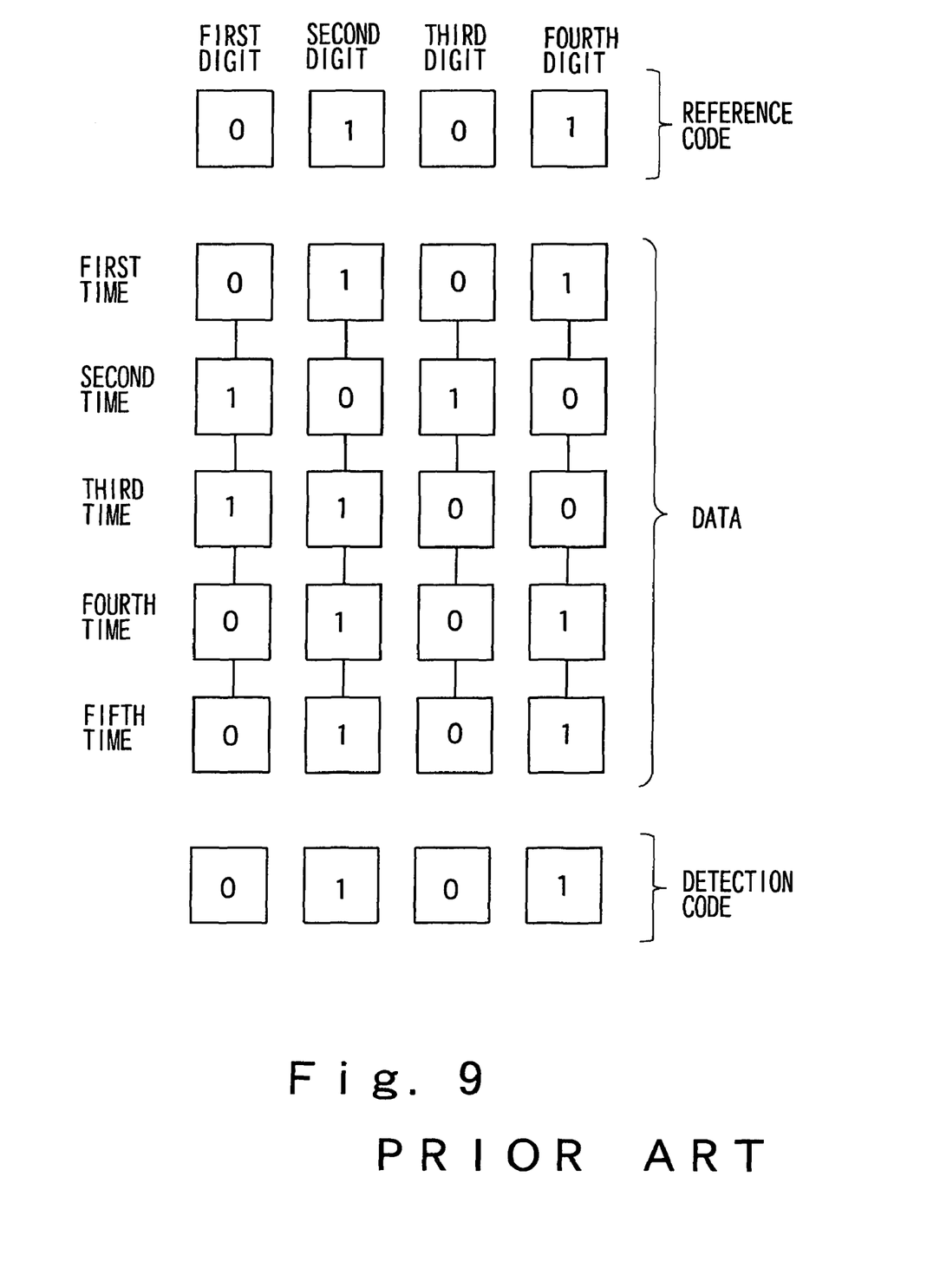
FIG. 9 is a diagram showing a code extracted by the prior art.

According to the conventional decoding method using the decision by the majority, even if the image is partially intentionally falsified, it follows that the correct code is decoded. For instance, as shown in FIG. 9, such a case is considered that the image in which to embed a 4-bit code so as to be repeated five times is partially falsified, and the data codes embedded second time and third time do not get coincident with the correct codes. Herein, if decoded by the method of deciding the data exhibiting the highest occurrence frequency per digit on the basis of the decision by the majority, it follows that the extracted code becomes coincident with the pre-embedded code due to decoding. Namely, as shown in FIG. 9, the pre-embedded code (which is a [reference code] illustrated in FIG. 9) is [0, 1, 0, 1], and by contrast the extracted data (which are [data] shown in FIG. 9) are [0, 1, 0, 1], [1, 0, 1, 0], [1, 1, 0, 0], [0, 1, 0, 1] and [0, 1, 0, 1]. Herein, in the first digit, an occurrence frequency of the data [1] is "2", and the occurrence frequency of the data [0] is "3". Hence, the data in the first digit of the code (which is a [detection code] shown in FIG. 9) is decided to be [0]. With respect to the second digit through the fourth digit of the code, the decisions are sequentially made by the same method. The thus decided detection code is [0, 1, 0, 1] and consequently becomes coincident with the reference code. It is therefore impossible to detect the falsified/non-falsified states of the image on the basis of the decoded code.

In the case of a face photo of a person, the falsification targeting at characteristic parts such as an eye and a nose is easy to be conducted. Even if the falsification targeting at these characteristic parts is carried out, according to the conventional decoding method based on the decision by the majority that does not involve weighting, it follows that there is selected a value exhibiting the highest occurrence frequency in values of the respective digits of the code embedded a plural number of times. Because of selecting the value exhibiting the highest occurrence frequency in the values of the respective digits, the code extracted based on the decision by the majority is not inverted even when some of the characteristic parts are falsified. Hence, even when conducting the falsification targeting at the characteristic parts in the image, according to the prior art, the correct code is decoded, with the result that the falsification is undetectable.

It is an object of the present invention, which was devised in view of the problems described above, to provide a decoding device, a decoding method and a decoding program that are capable of detecting the falsified/non-falsified states of the image even when the image partially falsified.

The present invention takes, in order to solve the problems described above, a scheme of weighting the data embedded into the image and judging whether the image is falsified or non-falsified, according to whether a detection code decided based on a decision by a weighted majority is correct or erroneous. With this scheme, it is possible to detect falsified/non-falsified states of the image even when the image is partially falsified.

To give full details, a decoding device for a code embedded in an image, comprises data extracting units extracting data from an image in which to embed a reference code organized by pieces of data of one or more digits (M-digits) and serving as the reference for detecting falsification, into image segments a plural number of times (N-times), data occurrence frequency calculating units calculating, if the data extracted from the image segments disposed in the same digit in the image become discrepant between a plurality of different reference codes, an occurrence frequency of each piece of data on a digit-by-digit basis, weighting units setting a weight corresponding to the occurrence frequency for every reference code so that the data with a smaller occurrence frequency in the data is decided as a result of detection based on a decision by a weighted majority, or so that the decision of the detection result based on the decision by the weighted majority gets unable to be made due to equivalence in the decision by the weighted majority, first decision-by-majority units deciding the detection result of the data for each digit on the basis of the decision by the weighted majority that adds the weight to the occurrence frequency of the data, and judging units judging whether the image is falsified or non-falsified in accordance with whether the detection code organized by combining the detection results per digit decided by the first decision-by-majority units, is correct or erroneous.

The decoding device according to the present invention is based on the premise that if the image is partially falsified, there is a high probability that the data extracted from this falsified part gets different from the data before being falsified. For example, if the image, into which a code is embedded by utilizing a most significant bit of the pixel values of the image data, is falsified, there is the high probability that the pixel value of the falsified area takes a value different from the pixel value before being falsified. If the pixel value changes before and after being falsified, the code to be extracted also changes.

Such being the case, the scheme is that the weight of the data with the smaller occurrence frequency is set equal to or heavier than the weight of the data with the larger occurrence frequency so that the data with the smaller occurrence frequency in the extracted data is decided based on the decision by the majority or so that the data can not be decided due to the equivalence in the decision by the majority. Then, the falsified/non-falsified states of the image are judged based on the detection code decided by the weighted majority having addition of the weight and organized by combining the detection results per digit. As this type of decision by the weighted majority is taken, if the image is partially falsified, it does not happen that the data with the larger occurrence frequency, which does not change before and after being falsified, is decided. Hence, the decoding method based on this type of decision by the weighted majority, since the detection code extracted when the image is partially falsified becomes different from the reference code embedded into the image before being falsified, makes it possible to detect the falsified/non-falsified states of the image on the basis of the detection code.

From the above, according to the decoding device of the present invention, it is possible to detect the falsified/non-falsified states of the image even if the image is partially falsified.

Further, in the decoding device described above, the decoding device may further comprise second decision-by-majority units deciding the detection result of the data for each digit on the basis of a decision by an unweighted majority that does not add the weight to the occurrence frequency of the data, wherein the judging units may judge that the image is falsified if an average code organized by combining the detection results on the digit-by-digit basis decided by the second decision-by-majority units, is not coincident with the detection code.

According to this scheme, even when unable to acquire the pre-embedded reference code, it is feasible to detect the falsified/non-falsified states.

Still further, in the decoding device described above, each value of the reference code may consist of a binary number, and the weighting units may decide a weight of each value of the data so that a value calculated by a mathematical expression "$P-Q+1$" where P is a data count with a larger occurrence frequency in the data and Q is a data count with a smaller occurrence frequency in the data, becomes a weight of the data with the smaller occurrence frequency in the data of the image segment existing a weighting target area in which to conduct weighting in the image.

With this scheme, it can be set that the data with the smaller occurrence frequency, which changes before and after the falsification of the image, is decided based on the decision by the majority, or that the data can not be decided due to the equivalence in the decision by the majority.

Still further, the present invention is grasped from an aspect of a method. Namely, a decoding method for a code embedded in an image, may comprise a data extracting step of extracting data from an image in which to embed a reference code organized by pieces of data of one or more digits (M-digits) and serving as the reference for detecting falsification, into image segments a plural number of times (N-times), a data occurrence frequency calculating step of calculating, if the data extracted from the image segments disposed in the same digit in the image become discrepant between a plurality of different reference codes, an occurrence frequency of each piece of data on a digit-by-digit basis, a weighting step of setting a weight corresponding to the occurrence frequency for every reference code so that the data with a smaller occurrence frequency in the data is decided as a result of detection based on a decision by a weighted majority, or so that the decision of the detection result based on the decision by the weighted majority gets unable to be made due to equivalence in the decision by the weighted majority, a first decision-by-majority step of deciding the detection result of the data for each digit on the basis of the decision by the weighted majority that adds the weight to the occurrence frequency of the data, and a judging step of judging whether the image is falsified or non-falsified in accordance with whether the detection code organized by combining the detection results per digit decided in the first decision-by-majority step, is correct or erroneous.

Yet further, the present invention is also grasped from an aspect of a program. Namely, a decoding program for a code embedded in an image, may make a computer execute a data extracting step of extracting data from an image in which to embed a reference code organized by pieces of data of one or more digits (M-digits) and serving as the reference for detecting falsification, into image segments a plural number of times (N-times), a data occurrence frequency calculating step of calculating, if the data extracted from the image segments disposed in the same digit in the image become discrepant between a plurality of different reference codes, an occurrence frequency of each piece of data on a digit-by-digit basis, a weighting step of setting a weight corresponding to the occurrence frequency for every reference code so that the data with a smaller occurrence frequency in the data is decided as a result of detection based on a decision by a weighted majority, or so that the decision of the detection result based on the decision by the weighted majority gets unable to be made due to equivalence in the decision by the weighted majority, a first decision-by-majority step of deciding the detection result of the data for each digit on the basis of the decision by the weighted majority that adds the weight to the occurrence frequency of the data, and a judging step of judging whether the image is falsified or non-falsified in accordance with whether the detection code organized by combining the detection results per digit decided in the first decision-by-majority step, is correct or erroneous.

According to the present invention, it is possible to detect the falsified/non-falsified states of the image even if the image is partially falsified.

DETAILED DESCRIPTION OF THE INVENTION

A decoding device, a decoding method and a decoding program for a code embedded in an image according to an embodiment of the present invention will hereinafter be described in an exemplificative manner. The embodiments illustrated as below are exemplifications, and the present invention is not limited to these configurations.

Configuration of First Embodiment

Figure 1:
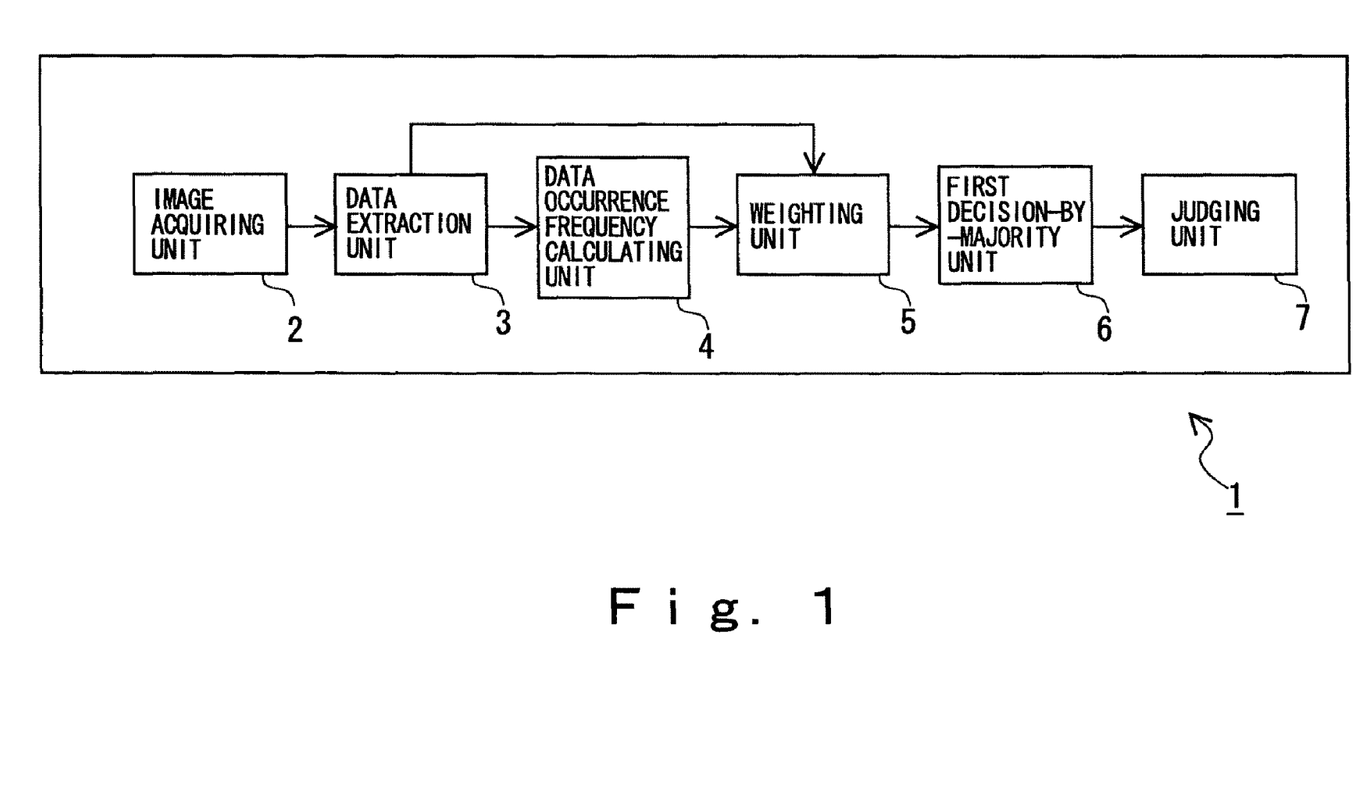
FIG. 1 is a diagram of a whole configuration of a decoding device.

FIG. 1 shows a whole configuration of a decoding device 1 according to one embodiment of the present invention. The decoding device 1 includes an image acquiring unit 2, a data extraction unit 3 (corresponding to [data extracting units] according to the present invention), a data occurrence frequency calculation unit 4 (corresponding to [data occurrence frequency calculating units] according to the present invention), a weighting unit 5 (corresponding to [weighting units] according to the present invention), a first decision-by-majority unit 6 (corresponding to [first decision-by-majority units] according to the present invention) and a judging unit 7 (corresponding to [judging units] according to the present invention).

These components may be actualized in such away that a computer having a CPU (Central Processing Unit), a memory, etc executes a decoding program according to the present invention, and may also be actualized by electric circuits.

The image acquiring unit 2 acquires a target image undergoing a data falsified/non-falsified judgment as image data by use of a camera, a scanner, etc including an imaging device such as a CCD (Charge coupled Device), a MOS (Metal Oxide Semiconductor) device, etc. The acquired image is transmitted to the data extraction unit 3. It should be noted that a premise in the first embodiment is that the image is acquired by employing the camera etc. The present invention is not, however, limited to this method. For instance, the image may also be acquired from, e.g., an electronic file on the network.

The data extraction unit 3 extracts the data consisting of (M×N) pieces of values embedded in the image transmitted from the image acquiring unit 2. The data extraction unit 3 reads the data in a way that compares neighboring image segments with each other in terms of a relationship between level magnitudes of pixel values of these image segments in the image segmented into plural pieces, i.e., (M×N) pieces of image segments. The data extraction unit 3 transmits the data consisting of extracted (M×N) pieces of values to the data occurrence frequency calculation unit 4 and to the weighting unit 5.

The data occurrence frequency calculation unit 4, when the data transmitted from the data extraction unit 3 has discrepancy between a plurality of rows, calculates a data occurrence frequency per digit. For example, if the data of the first row is [1], the data of the second row is [0] and the data of the third row is [1], an occurrence frequency of the data [1] is "2", and the occurrence frequency of the data is "1". The data occurrence frequency calculation unit 4 transmits the thus-calculated data occurrence frequencies to the weighting unit 5.

The weighting unit 5 refers to the occurrence frequencies of the data transmitted from the data occurrence frequency calculation unit 4, and sets a weight corresponding to the occurrence frequency on a data-by-data basis so that the data having the smaller occurrence frequency is decided as a result of detection based on a decision by a weighted majority, or so that the decision of the data gets unable to be made due to equivalence in the decision by the weighted majority.

To be specific, a value obtained by adding "1" to a value calculated in a way that subtracts a data count with the smaller occurrence frequency from a data count with the larger occurrence frequency, is set as a weight of the data with the smaller occurrence frequency. With this contrivance, a total of the weights of the data with the smaller occurrence frequency become equal to or greater than a total of the weights of the data with the larger occurrence frequency.

The weighting unit 5 weights the data transmitted from the data extraction unit 3, and transmits the weighted data to the first decision-by-majority unit 6.

The first decision-by-majority unit 6 acquires the weighted data transmitted from the weighting unit 5. The first decision-by-majority unit 6 makes a decision by the weighted majority for comparing the totals of the weights with each other, thereby deciding a detection result of the data with respect to each digit. The first decision-by-majority unit 6 organizes a detection code in which to combine the detection results per digit that are decided by the weighted majority. The first decision-by-majority unit 6 transmits the thus-organized detection code to the judging unit 7. Herein, the detection code is a code decided by the first decision-by-majority unit 6 and is also a code used for judging about falsification.

The judging unit 7 judges, based on the detection code transmitted from the first decision-by-majority unit 6, whether the falsification is made or not.

Outline of Processing Flow in First Embodiment

Figure 2:
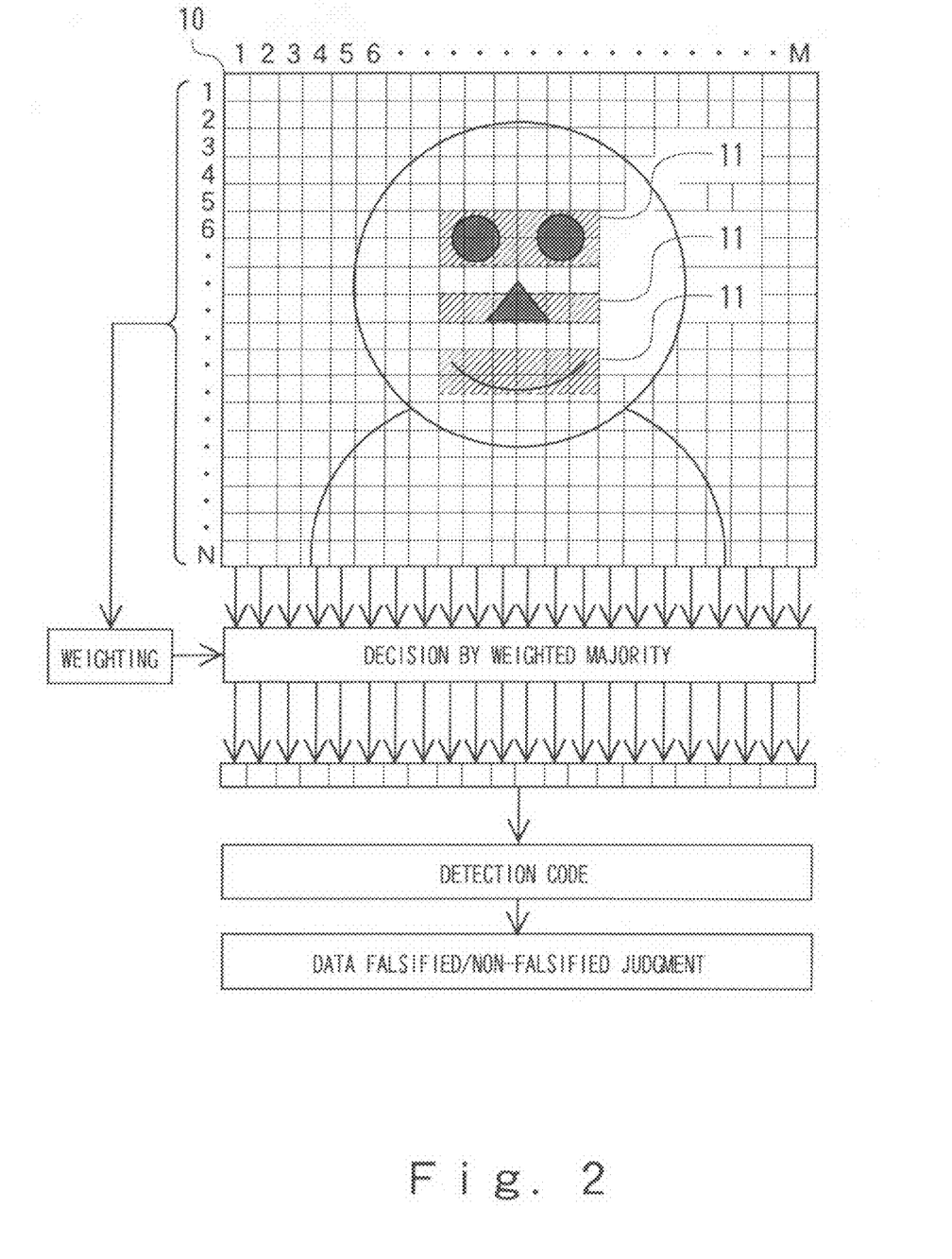
FIG. 2 is a diagram of an outline of a processing flow of the decoding device.

FIG. 2 is a diagram of an outline of a processing flow of a falsification detecting method according to the first embodiment. In the first embodiment, as shown in FIG. 2, parts such as an eye, a nose and a mouth is designated as weighting target areas 11. Then, the data embedded in an image 10 is weighted, and the detection code is acquired by executing the decision by the weighted majority. If an indeterminate value is contained in the detection code, it is judged that the falsification is made.

Details of Processing Flow in First Embodiment

Figure 3:
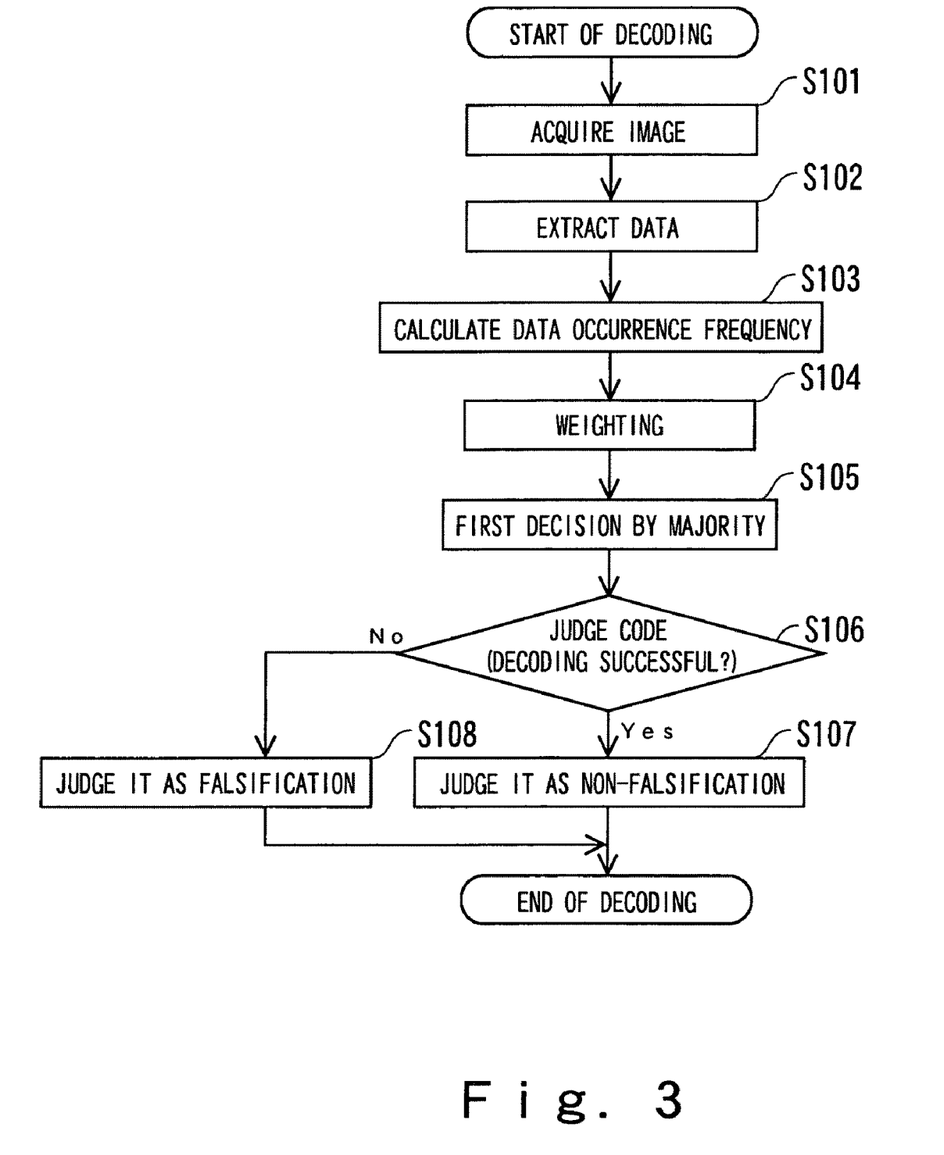
FIG. 3 is a processing flowchart of the decoding device.

Next, a specific processing flow of the decoding device 1 will hereinafter be explained with reference to a flow chart shown in FIG. 3.

Figure 4:
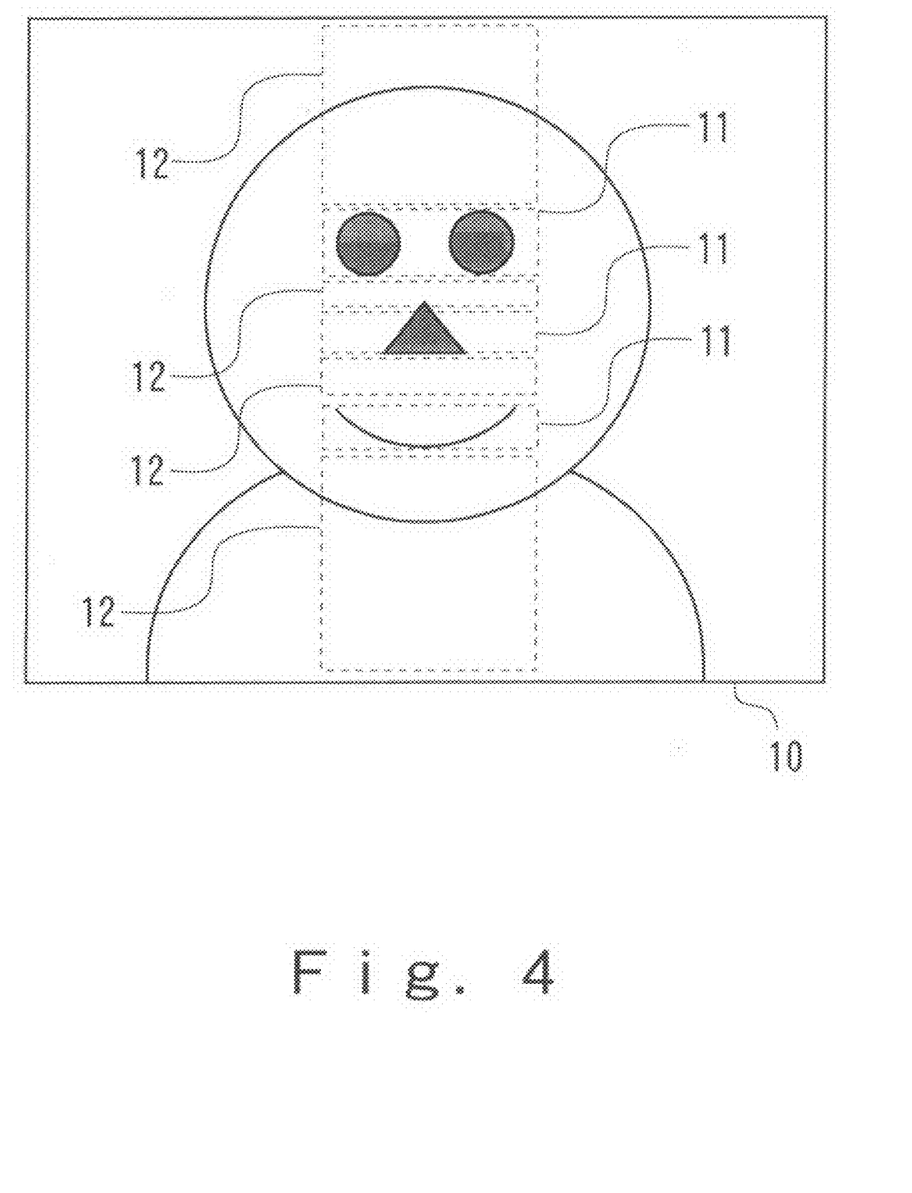
FIG. 4 is a diagram showing a falsification detecting target image.

FIG. 4 shows the target image 10 undergoing the data falsified/non-falsified judgment in the first embodiment. The first embodiment aims at detecting whether a face photo used for a security card utilized in the office etc is falsified or not. Generally, it is considered that the parts such as the eye, the nose and the mouth are most characteristic of a human face. On the occasion of making collation by comparing the photo with the person himself or herself (the original), these characteristic parts are objects to be compared. Hence, the face photo is often falsified targeting at the characteristic parts such as the eye, the nose and the mouth. Accordingly, in the first embodiment, in the image 10, the parts such as the eye, the nose and the mouth are set as the weighting target areas 11 subjected to weighting. Further, parts other than these target areas 11 are set as weighting off-target areas 12. Note that the target image 10 subjected to the data falsified/non-falsified detection may also be data of the face photo for a passport, image data of a high-grade pictorial art, image data of important documents and so on. Further, the weight target areas 11 subjected to weighting are not limited to only the characteristic parts such as the eye, the nose and the mouth, and the entire area of the image may be set as the weight target area 11.

Figure 5:
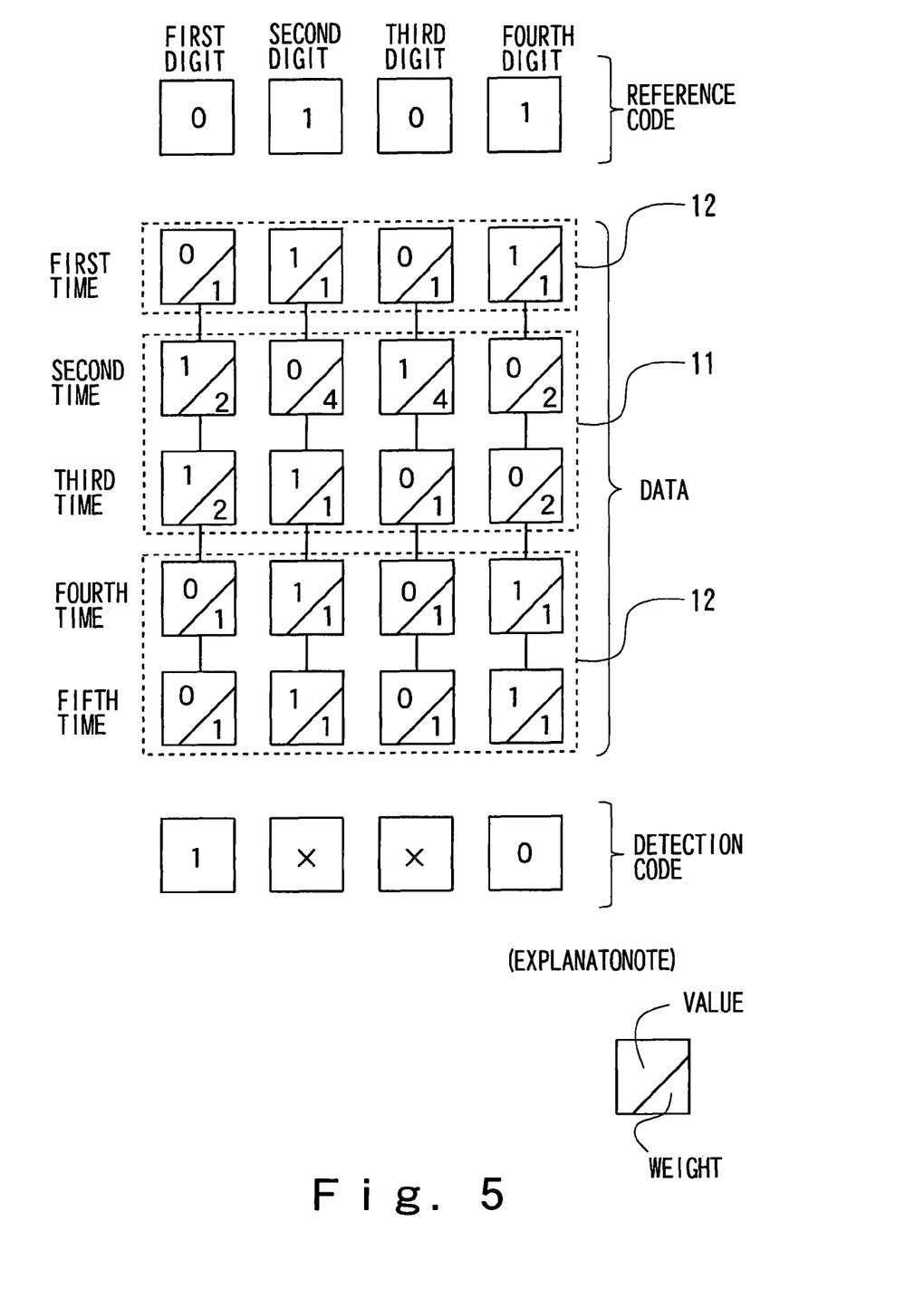
FIG. 5 is a diagram showing an extracted code.

It is to be noted that for the explanatory convenience's sake, in the following description, a digit count M of a reference code for detecting the falsification embedded in the image 10 is set such as M=4, and an embedding count N of the reference code is set such as N=5. Moreover, the weighting target areas 11 shall be the areas in which to embed the codes written second time and third time. Further, the areas other than the weighting target areas 11 shall be the weighting off-target areas 12. As illustrated in FIG. 5, it is assumed that the reference code consisting of [0, 1, 0, 1] is embedded five times. Then, it is also assumed that the falsification of the image 10 changes the code embedded second time into [1, 0, 1, 0] and the code embedded third time into [1, 1, 0, 0]. A left upper value in the frame in FIG. 5 represents the extracted data. Herein, the reference code is a code for detecting the falsification of the image 10 and is a code previously embedded in the image before being falsified.

Figure 6:
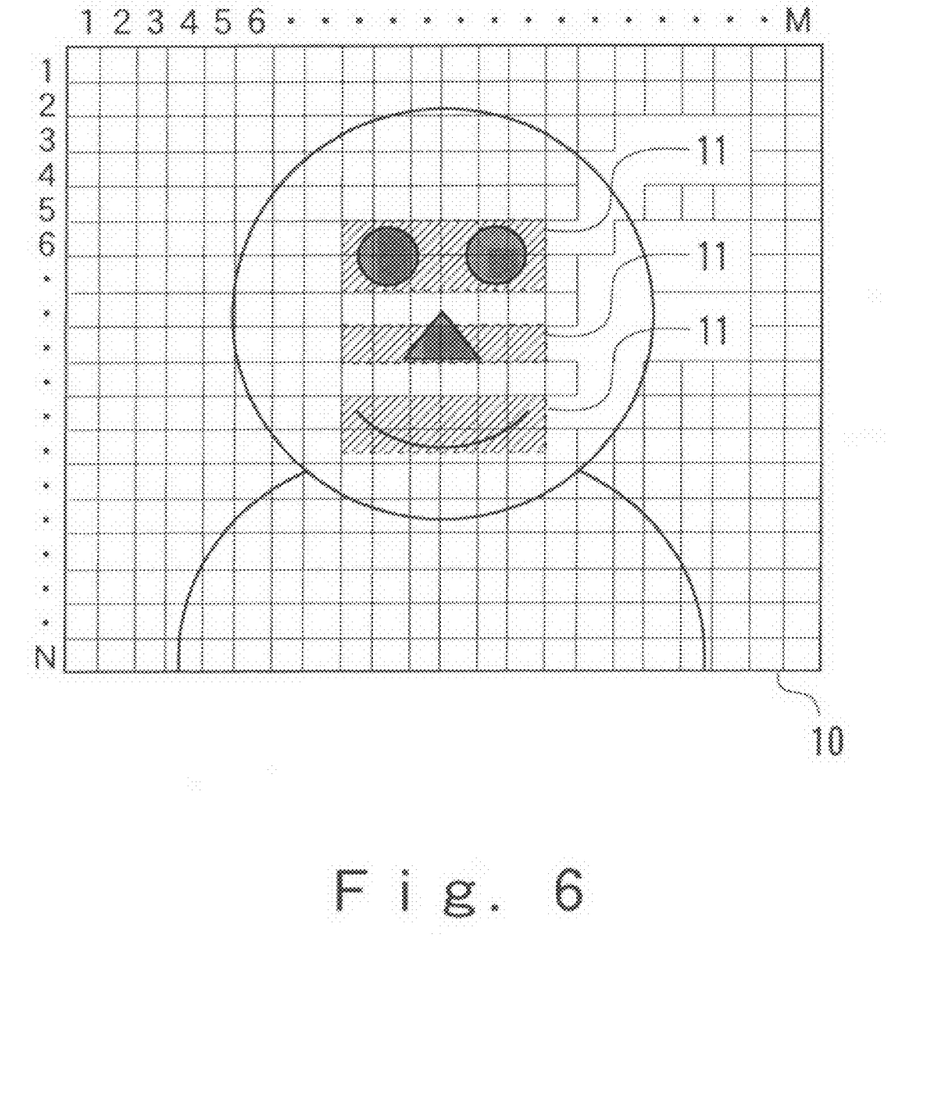
FIG. 6 is a diagram showing the falsification detecting target image.

The image acquiring unit 2 acquires the image 10 (S101) In the image 10, as illustrated in FIG. 6, the data are embedded in (M×N) pieces of image segments. The data extraction unit 3 analyzes the image 10 transmitted from the image acquiring unit 2, and extracts 20-pieces of data (M×N=4×5=20) embedded in the image 10 as shown in FIG. 5 (S102). The data extraction unit 3 transmits the extracted data to the data occurrence frequency calculation unit 4 and to the weighting unit 5.

The data occurrence frequency calculation unit 4 decides a data occurrence frequency per digit in the following manner with respect to the data, consisting of the values such as [0, 1, 0, 1], [1, 0, 1, 0], [1, 1, 0, 0], [0, 1, 0, 1] and [0, 1, 0, 1], transmitted from the data extraction unit 3 (S103)

An assumption is that "P" represents a data count with the larger occurrence frequency, and "Q" represents a data count with the smaller occurrence frequency. The first digit is such that the occurrence frequency of the data [1] is twice, and the occurrence frequency of the data [0] is three times. Hence, the data counts are given such as $P_1=3$ and $Q_1=2$. In the second digit, the occurrence frequency of the data [1] is four times, and the occurrence frequency of the data [0] is once. Therefore, the data counts are given such as $P_2=4$ and $Q_2=1$. In the third digit, the occurrence frequency of the data [1] is once, and the occurrence frequency of the data [0] is four times. Therefore, the data counts are given such as $P_3=4$ and $Q_3=1$. In the fourth digit, the occurrence frequency of the data [1] is three times, and the occurrence frequency of the data [0] is twice. Hence, the data counts are given such as $P_4=3$ and $Q_4=2$.

The data occurrence frequency calculation unit 4 transmits the calculated data counts $P_1$ through $P_4$ and $Q_1$ through $Q_4$ to the weighting unit 5.

The weighting unit 5, when acquiring $P_1$ through $P_4$ and $Q_1$ through $Q_4$ from the data occurrence frequency calculation unit 4, sorts pieces of data transmitted from the data extraction unit 3 into the weighting target areas 11 and into the weighting off-target areas 12 as shown in FIG. 5 (S104).

Next, the weighting unit 5 decides, based on a mathematical expression "P−Q+1", the weight of each piece of data. This weight becomes a weight of the data with the smaller occurrence frequency in the data existing within the weight target areas 11. Further, the weight of the data with the larger occurrence frequency shall be set to "1".

In the first digit, the data counts are given such as $P_1=3$ and $Q_1=2$, and hence the weight of the data [1] defined as the data with the smaller occurrence frequency becomes "2", while the weight of the data [0] defined as the data with the larger occurrence frequency becomes "1".

In the second digit, the data counts are given such as $P_2=4$ and $Q_2=1$, and therefore the weight of the data [0] as the data with the smaller occurrence frequency becomes "4", while the weight of the data [1] as the data with the larger occurrence frequency becomes "1".

In the third digit, the data counts are given such as $P_3=4$ and $Q_3=1$, and therefore the weight of the data [1] as the data with the smaller occurrence frequency becomes "4", while the weight of the data [0] as the data with the larger occurrence frequency becomes "1".

In the fourth digit, the data counts are given such as $P_4=3$ and $Q_4=2$, and hence the weight of the data [0] as the data with the smaller occurrence frequency becomes "2", while the weight of the data [1] as the data with the larger occurrence frequency becomes "1". Note that the weight of each piece of data is shown in the right lower area within the frame in FIG. 5.

The weighting unit 5 weights the data acquired from the data extraction unit 3, and transmits the weighted data to the first decision-by-majority unit 6.

The first decision-by-majority unit 6 decides by the majority the data having the heaviest weight per digit by referring to the weights taking the respective values with respect to pieces of weighted data transmitted from the weighting unit 5 (S105). As illustrated in FIG. 5, in the first digit, the weights of the data [0] total to "3", and the weights of the data [1] total to "4". Hence, in the first digit of the detection code, the data [1] is decided based on the decision by the weighted majority. Further, in the second digit, the weights of the data [0] total to "4", and the weights of the data [1] also total to "4". Therefore, in the second digit of the detection code, the data can not be decided based on the decision by the majority. Accordingly, in the second digit of the detection code, data [x] (indeterminate value) is decided. With respect to the third digit and the fourth digit, the data are decided by the same method. The first decision-by-majority unit 6 thus acquires the detection code [1, x, x, 0]. The first decision-by-majority unit 6 transmits the acquired detection code to the judging unit 7.

The judging unit 7 analyzes the detection code transmitted from the first decision-by-majority unit 6 (S106) If the decoding gets successful (if the detection code contains none of the indeterminate value [x]), the image 10 is judged not to be falsified (S107). In the first embodiment, however, the detection code is [1, x, x, 0]. Hence, the detection code contains the indeterminate value [x]. Accordingly, the judging unit 7 judges that the image 10 is falsified (S108)

From what has been described above, the decoding device 1 according to the first embodiment makes it possible to detect the falsified state even from the partially-falsified image 10.

It is to be noted that the first embodiment may take, though the falsified/non-falsified states are judged from whether the detection code contains the indeterminate value [x] or not, such a scheme that the reference code embedded in the image is compared with the detection code, and the image is judged not to be falsified if these codes are coincident with each other and judged to be falsified if these codes are not coincident with each other.

Configuration of Second Embodiment

Figure 7:
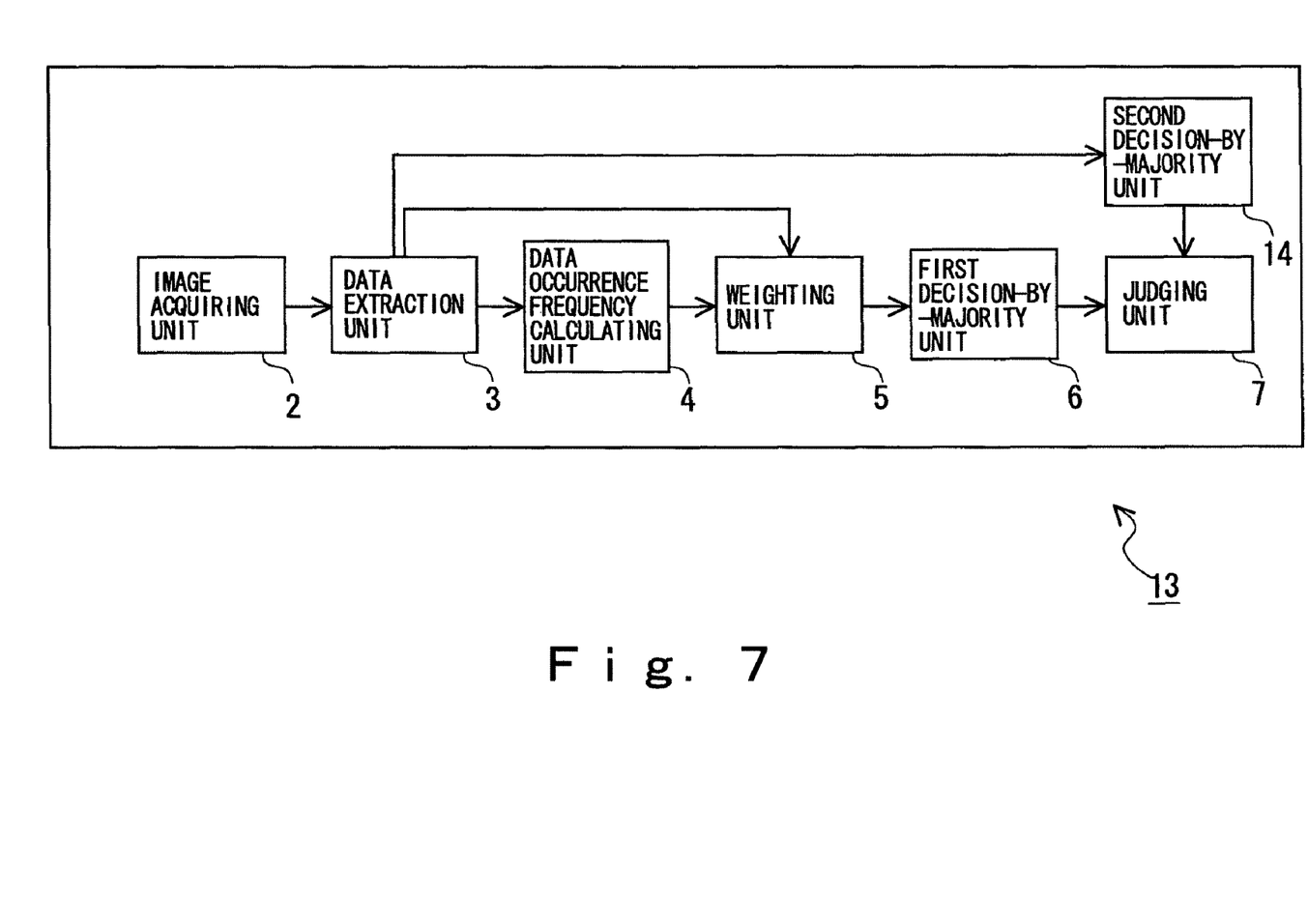
FIG. 7 is a diagram of the whole configuration of the decoding device.

FIG. 7 shows a whole configuration of a decoding device 13 according to a second embodiment of the present invention. The decoding device 13 according to the second embodiment compares, with the detection code, a code decided by conducting the decision by the majority that does not involve weighting the data extracted from the image, thereby judging whether the image is falsified or non-falsified. The decoding device 13 further includes, in addition to the components of the decoding device 1 according to the first embodiment discussed above, a second decision-by-majority unit 14. Note that for the explanatory convenience's sake, the same components and the same processing method (steps) in the first embodiment discussed above are marked with the same numerals and symbols, and their explanations are omitted.

The second decision-by-majority unit 14 acquires the unweighted data transmitted from the data extraction unit 3. The second decision-by-majority unit 14 compares the occurrence frequencies of the respective values of the data with each other on the digit-by-digit basis, and decides a value exhibiting the highest frequency per digit. The second decision-by-majority unit 14 transmits to the judging unit 7 an average code decided by the majority and then organized.

Herein, the average code is a code decided by the second decision-by-majority unit 14 and is also a code used for judging about the falsification.

Processing Flow in Second Embodiment

Figure 8:
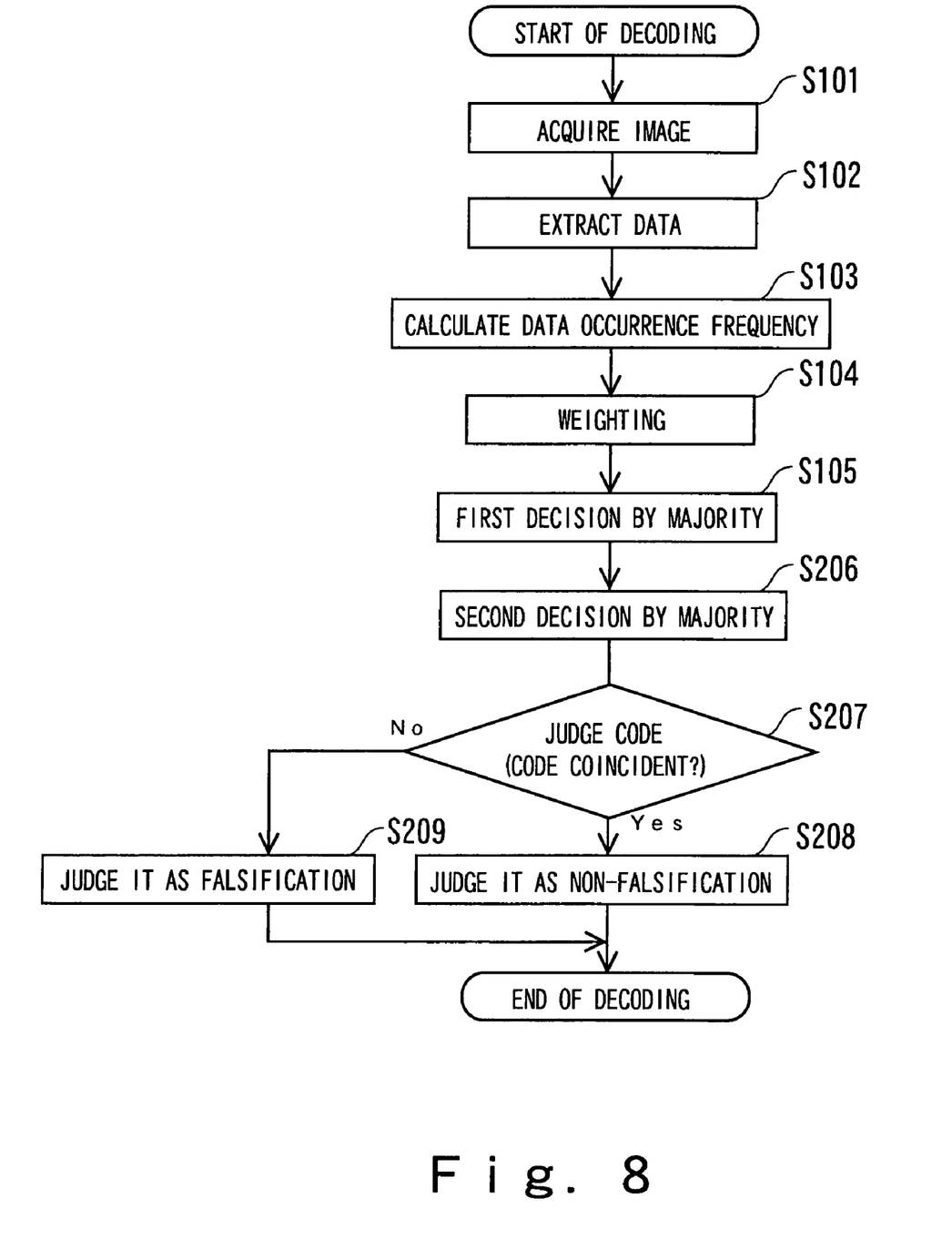
FIG. 8 is a processing flowchart of the decoding device.

Next, a processing flow of the decoding device 13 will be explained with reference to a flowchart shown in FIG. 8.

The second decision-by-majority unit 14 compares the occurrence frequencies of the respective values of the data on the digit-by-digit basis with respect to the unweighted data transmitted from the data extraction unit 3, and decides the average code (S206). As shown in FIG. 5, in the first digit, the occurrence frequency of a symbol [0] is "3", and the occurrence frequency of a symbol [1] is "2". Hence, the first digit of the average code is decided to be the symbol [0] by the decision by the majority. Further, in the second digit, the occurrence frequency of the symbol [0] is "1", and the occurrence frequency of the symbol [1] is "4". Therefore, the second digit of the average code is decided to be the symbol [1] on the basis of the decision by the majority. With respect to the third digit and the fourth digit, the symbols are decided by the same method. The second decision-by-majority unit 14 acquires the average code [0, 1, 0, 1] by such a method. The second decision-by-majority unit 14 transmits the acquired average code to the judging unit 7.

The judging unit 7 compares the detection code transmitted from the first decision-by-majority unit 6 with the average code transmitted from the second decision-by-majority unit 14 (S207). If these codes are coincident with each other, the image 10 is judged not to be falsified (S208). In the second embodiment, however, the average code is [0, 1, 0, 1], and by contrast the detection code is [1, x, x, 0]. Hence, the codes are not coincident with each other. Accordingly, the judging unit 7 judges that the image 10 is falsified (S209).

From the above, according to the decoding device 13 in the second embodiment, it is possible to detect the falsified/non-falsified states in the case of being unable to acquire the reference code embedded in the image 10 and even in the case of no occurrence of the indeterminate value in the detection code in spite of the partial falsification of the image 10. Further, it is feasible to acquire the reference code embedded in the image 10 and to detect the falsification simultaneously, and therefore the decoding processing time and the cost can be reduced.

Recording Medium Readable by Computer

A program for making a computer, other machines, devices (which will hereinafter be referred to as the computer etc) actualize any one of the functions given above can be recorded on a recording medium readable by the computer etc. Then, the computer etc is made to read and execute the program on this recording medium, whereby the function can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disk, a magneto-optic disk, a CD-ROM, a CD-R/W, a DVD, a DAT, an 8 mm tape, a memory card, etc are given as those demountable from the computer etc.

Further, a hard disk, a ROM (Read-Only Memory), etc are given as the recording mediums fixed within the computer etc.

The disclosures of Japanese patent application No. JP2006-212119 filed on Aug. 3, 2006 including the specification, drawings and abstract are incorporated herein by reference.

What is claimed is:

1. A decoding device for a code embedded in an image, comprising:
    a data extracting unit to extract data from an image embedded with a reference code into image segments a plural number of times (N-times), wherein the reference code is organized by pieces of data of one or more digits (M-digits) and serves as a reference for detecting falsification;
    a data occurrence frequency calculating unit to calculate, if the data, extracted from the image segments disposed in the same digit in the image, become discrepant with a plurality of different reference codes, an occurrence frequency of each piece of data on a digit-by-digit basis;
    a weighting unit to set a weight for every reference code so that the data with a smaller occurrence frequency in the extracted data becomes a majority in a decision by a weighted majority;
    a first decision-by-majority unit to decide the detection result of the data for each digit on the basis of the decision by the weighted majority that adds the weight to the occurrence frequency of the data; and
    a judging unit to judge whether the image is falsified or non-falsified in accordance with whether the detection code organized by combining the detection results per digit decided by the first decision-by-majority units, is correct or erroneous.

2. The decoding device for a code embedded in an image according to claim 1, wherein the judging unit, if the detection code contains the data unable to undergo the decision of the detection result based on the decision by the weighted majority due to the equivalence in the decision by the weighted majority, judges that the image is falsified.

3. The decoding device for a code embedded in an image according to claim 1, wherein the judging unit, if the detection code is not coincident with the reference code, judges that the image is falsified.

4. The decoding device for a code embedded in an image according to claim 1, further comprising a second decision-by-majority unit to decide the detection result of the data for each digit on the basis of a decision by an unweighted majority that does not add the weight to the occurrence frequency of the data,
    wherein the judging unit judges that the image is falsified if an average code organized by combining the detection results on the digit-by-digit basis decided by the second decision-by-majority unit, is not coincident with the detection code.

5. The decoding device for a code embedded in an image according to claim 1, wherein each value of the reference code consists of a binary number, and
    the weighting unit decides a weight of each value of the data so that a value calculated by a mathematical expression "P−Q+1" where P is a data count with a larger occurrence frequency in the data and Q is a data count with a smaller occurrence frequency in the data, becomes a weight of the data with the smaller occurrence frequency in the data of the image segment existing a weighting target area in which to conduct weighting in the image.

6. The decoding device for a code embedded in an image according to claim 5, wherein the weighting target area is decided by extracting a characteristic part in the image.

7. The decoding device for a code embedded in an image according to claim 5, wherein the weighting target area is decided by setting of a user.

8. A decoding method for a code embedded in an image, comprising:
- a data extracting step of extracting data from an image embedded with a reference code into image segments a plural number of times (N-times), wherein the reference code is organized by pieces of data of one or more digits (M-digits) and serves as the reference for detecting falsification;
- a data occurrence frequency calculating step of calculating, if the data extracted from the image segments disposed in the same digit in the image become discrepant with a plurality of different reference codes, an occurrence frequency of each piece of data on a digit-by-digit basis;
- a weighting step of setting a weight for every reference code so that the data with a smaller occurrence frequency in the extracted data becomes a majority in a decision by a weighted majority;
- a first decision-by-majority step of deciding the detection result of the data for each digit on the basis of the decision by the weighted majority that adds the weight to the occurrence frequency of the data; and
- a judging step of judging whether the image is falsified or non-falsified in accordance with whether the detection code organized by combining the detection results per digit decided in the first decision-by-majority step, is correct or erroneous.

9. The decoding method for a code embedded in an image according to claim 8, wherein the judging step includes, if the detection code contains the data unable to undergo the decision of the detection result based on the decision by the weighted majority due to the equivalence in the decision by the weighted majority, judging that the image is falsified.

10. The decoding method for a code embedded in an image according to claim 8, wherein the judging step includes, if the detection code is not coincident with the reference code, judging that the image is falsified.

11. The decoding method for a code embedded in an image according to claim 8, further comprising a second decision-by-majority step of deciding the detection result of the data for each digit on the basis of a decision by an unweighted majority that does not add the weight to the occurrence frequency of the data,
- wherein the judging step includes judging that the image is falsified if an average code organized by combining the detection results on the digit-by-digit basis decided in the second decision-by-majority step, is not coincident with the detection code.

12. The decoding method for a code embedded in an image according to claim 8, wherein each value of the reference code consists of a binary number, and
- the weighting step includes deciding a weight of each value of the data so that a value calculated by a mathematical expression "P−Q+1" where P is a data count with a larger occurrence frequency in the data and Q is a data count with a smaller occurrence frequency in the data, becomes a weight of the data with the smaller occurrence frequency in the data of the image segment existing a weighting target area in which to conduct weighting in the image.

13. The decoding method for a code embedded in an image according to claim 12, wherein the weighting target area is decided by extracting a characteristic part in the image.

14. The decoding method for a code embedded in an image according to claim 12, wherein the weighting target area is decided by setting of a user.

15. A non-transitory computer readable medium recorded with a decoding program for a code embedded in an image, making a computer execute:
- a data extracting step of extracting data from an image embedded with a reference code into image segments a plural number of times (N-times),
- wherein the reference code is organized by pieces of data of one or more digits (M-digits) and serves as the reference for detecting falsification;
- a data occurrence frequency calculating step of calculating, if the data extracted from the image segments disposed in the same digit in the image become discrepant with a plurality of different reference codes, an occurrence frequency of each piece of data on a digit-by-digit basis;
- a weighting step of setting a weight for every reference code so that the data with a smaller occurrence frequency in the extracted data becomes a majority in a decision by a weighted majority;
- a first decision-by-majority step of deciding the detection result of the data for each digit on the basis of the decision by the weighted majority that adds the weight to the occurrence frequency of the data; and
- a judging step of judging whether the image is falsified or non-falsified in accordance with whether the detection code organized by combining the detection results per digit decided in the first decision-by-majority step, is correct or erroneous.

16. The non-transitory computer readable medium recorded with a decoding program for a code embedded in an image according to claim 15, wherein the judging step includes, if the detection code contains the data unable to undergo the decision of the detection result based on the decision by the weighted majority due to the equivalence in the decision by the weighted majority, judging that the image is falsified.

17. The non-transitory computer readable medium recorded with a decoding program for a code embedded in an image according to claim 15, wherein the judging step includes, if the detection code is not coincident with the reference code, judging that the image is falsified.

18. The non-transitory computer readable medium recorded with a decoding program for a code embedded in an image according to claim 15, further making the computer execute a second decision-by-majority step of deciding the detection result of the data for each digit on the basis of a decision by an unweighted majority that does not add the weight to the occurrence frequency of the data,
- wherein the judging step includes judging that the image is falsified if an average code organized by combining the detection results on the digit-by-digit basis decided in the second decision-by-majority step, is not coincident with the detection code.

19. The non-transitory computer readable medium recorded with a decoding program for a code embedded in an image according to claim 15, wherein each value of the reference code consists of a binary number, and
- the weighting step includes deciding a weight of each value of the data so that a value calculated by a mathematical expression "P−Q+1" where P is a data count with a larger occurrence frequency in the data and Q is a data count with a smaller occurrence frequency in the data, becomes a weight of the data with the smaller occurrence frequency in the data of the image segment existing a weighting target area in which to conduct weighting in the image.

20. The non-transitory computer readable medium recorded with a decoding program for a code embedded in an image according to claim 19, wherein the weighting target area is decided by extracting a characteristic part in the image.

21. The non-transitory computer readable medium recorded with a decoding program for a code embedded in an image according to claim 19, wherein the weighting target area is decided by setting of a user.

* * * * *